Feb. 6, 1934.  A. C. SAXE  1,945,824
SAND STRAINER FOR PUMPS
Filed July 30, 1931
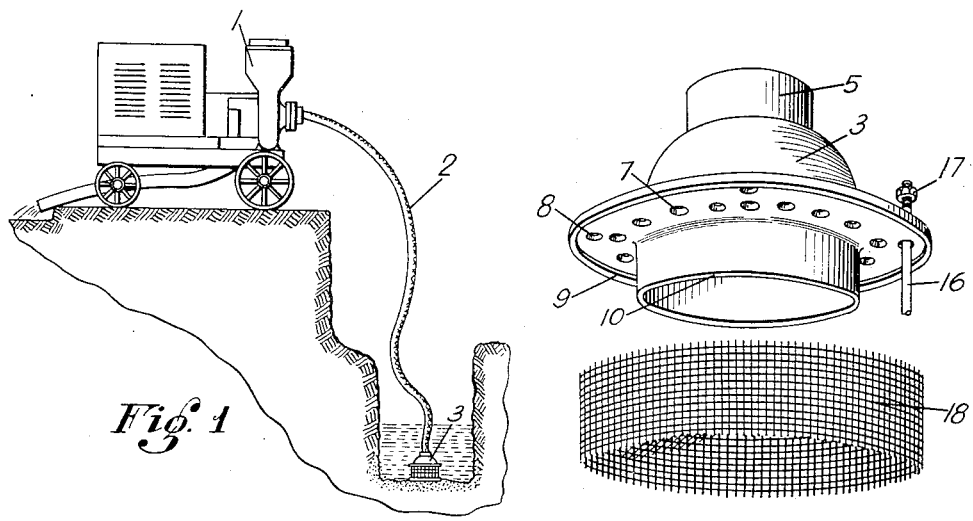
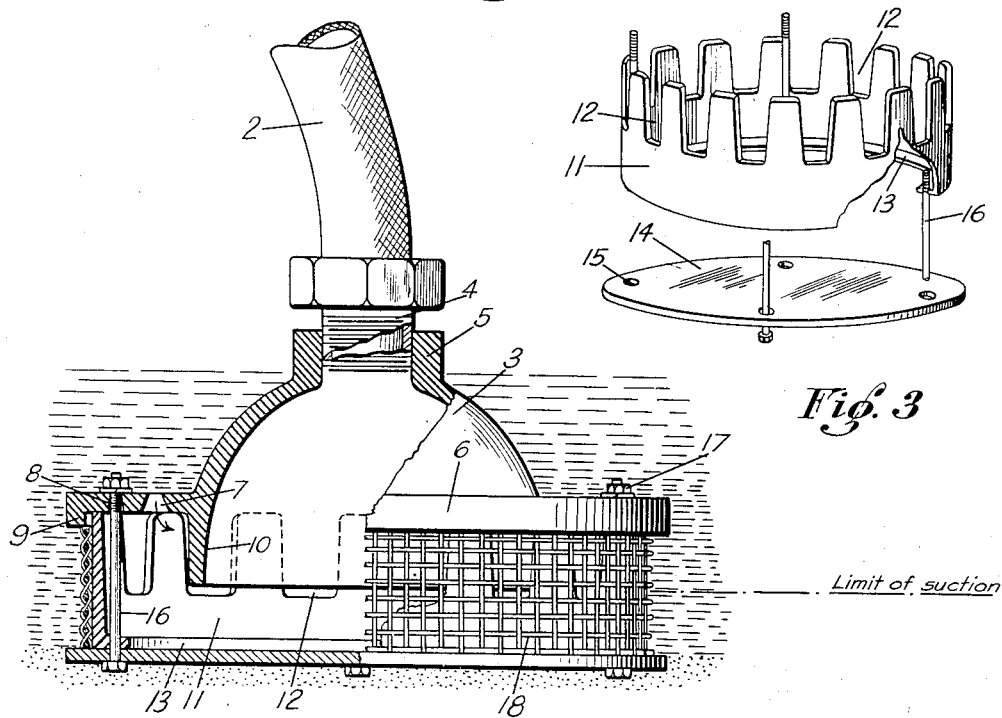
INVENTOR.
Arthur C. Saxe.
BY
Corbett & Mahoney
ATTORNEYS.

Patented Feb. 6, 1934

1,945,824

UNITED STATES PATENT OFFICE 1,945,824

SAND STRAINER FOR PUMPS

Arthur C. Saxe, Columbus, Ohio, assignor to The Jaeger Machine Company, Columbus, Ohio, a corporation of Ohio Application July 30, 1931. Serial No. 554,037

7 Claims. (Cl. 210—170)

My invention relates to sand strainers for pumps. It has to do particularly with a novel means for eliminating sand from the water being pumped out of an excavation, although there are structural features of my device which may be capable of wider application.

In the prior art, it has been customary to provide a strainer for the elimination of the sand from the water being removed from the excavation. However, the type of strainer customarily used has been of such structure that the water passes through the same entirely at the bottom and lower sides of the strainer. This has created a tendency on the part of the strainer to bury itself in the bed of a sandy excavation, particularly in the use of a flexible tubing for conducting the water to the pump. Furthermore, the usual construction of the strainer has been such as to produce an undesirably high velocity of water entering the strainer with a consequently increased sucking in of sand. Likewise, prior strainers have been subject to the defect of sucking air with a consequent loss of prime of the pump.

One of the objects of my invention is to provide a sand strainer which will not tend to bury itself in the sand, whether it be used with a flexible tubing or not.

Another object of my invention is to provide a construction which will ensure that the water is drawn through the strainer at a comparatively low velocity.

Another object of my invention is to provide a construction wherein the water may be pumped down to an extremely low level without causing the taking in of air and consequent loss of prime of the pump.

In its preferred embodiment, my invention contemplates the provision of a sand strainer whose bottom and lower sides are closed, with the result that the water enters the strainer entirely through the upper portion thereof. Furthermore, this strainer is provided with a trap which is so located that the water level in the excavation may be reduced to an extremely low point without causing the pump to lose its prime. Likewise, this trap is of such construction and of such diameter that it will greatly decrease the velocity of the water, as compared with the velocity which would exist with the normal type of strainer and with the usual type of suction pipe.

The preferred embodiment of my invention is shown in the accompanying drawing wherein similar characters of reference designate corresponding parts and wherein:

Figure 1 is a side elevation of a pump embodying a strainer constructed in accordance with my invention, this apparatus being shown in operation removing water from an excavation.

Figure 2 is a side elevation, partially broken away, of my strainer.

Figure 3 is a perspective view of my strainer with the parts thereof disassembled.

In the drawing, the main part of my pump is designated generally at 1. It is shown provided with a suction hose 2. This suction hose is of flexible form and the lower end of it is shown equipped with my sand strainer.

This sand strainer comprises a bell-like structure 3 connected to an externally threaded coupling 4 upon the end of the hose by means of an internally threaded collar 5 which is integrally formed on top of the bell-like member 3. The bell-like member 3 is further provided adjacent its lower end with a laterally extending annular flange 6 having a series of vertical apertures 7 provided therein, these apertures 7 being downwardly flared.

The annular flange 6 is further provided with a series of bolt holes 8. Likewise, this annular flange 6 is provided at its outer periphery with a downwardly turned integral flange 9. At the inner periphery of the annular flange 6, the bell-like member 3 has a downwardly depending cylindrical extension 10, as shown best in Figure 3.

Complemental to the bell-like member 3 of my sand strainer, is a substantially cylindrical unit 11 having cutaway portions 12 arranged in series in the upper portion thereof. This cylindrical unit is provided on its inner periphery with a perforated flange 13, the perforations in this flange serving as bolt holes which are designed to be aligned with the bolt holes 8 as illustrated in Figure 2.

In further complement to the bell-like member 3 and the cylindrical unit 11, there is provided a disk-like base-plate 14 of slightly greater diameter than the cylindrical unit 11. This disk-like base-plate 14 is devoid of perforations with the exception of the bolt holes 15 which are also designed to be aligned with the bolt holes in the flange 13 and with the bolt holes 8. Bolts 16 pass through the said bolt holes and are provided with nuts 17 for maintaining the bell-like member 3, the cylindrical unit 11 and the base-plate 14 in assembled relation, as illustrated in Figure 2.

As a further complement to the parts thus far described, there is provided a cylindrical screen 18 which closely embraces the cylindrical unit 11 and rests at its lower end upon the upper surface of the base-plate 14. At its upper end, it extends to the lower edge of the integral peripheral flange 9 of the bell-like unit and therefore covers the exposed area of the cutaway portions 12.

In the operation of my device, the sand strainer may be lowered into a water-filled excavation until the base-plate thereof rests upon the bottom of the excavation. Being of a comparatively great area, this base-plate tends to preclude the burying of the strainer in the bed upon which it rests, whether this bed be of sandy or other material. The water which enters the strainer does so through the cutaway portions 12 and the apertures 7 and no water enters through the bottom of the strainer or through the lower parts of the sides. This further reduces the danger of the strainer burying itself in the bed upon which it rests, whether this bed be of sandy or other material. The screen 18 prevents floating sticks from entering the cutaway portions 12 and, since these sticks float in a horizontal position rather than in a vertical position, they will not enter the holes 7.

The depending cylindrical portion 10 of the bell-like member 3 serves as a trap, with the result that even though water is being taken in through the cutaway portions 12 of the cylindrical unit 11 and through the apertures 7, no air will be taken in until the water level in the excavation is reduced in depth to the level indicated by the line designated "Limit of Suction" in Figure 2. Thus, it will be apparent that, with my device, the water in an excavation may be pumped down to a very shallow depth of an inch or two without causing the pump to lose its prime.

Furthermore, since the ability of a stream of water to carry sand depends upon its velocity and since the velocity of a stream of water is reduced as the diameter of the opening through which this stream of water flows is increased, the increased diameter of my trap in comparison with the diameter of the suction hose greatly reduces the velocity of the water and greatly reduces the tendency of sand to be drawn through the strainer. For example, it has been found that when 200 gallons of water passes through an opening 2" in diameter in one minute, it travels at a rate of 20.4 ft. per second. However, if the opening is increased to 6" diameter, the velocity of the water is reduced to 2.28 ft. per second. Thus, by using my trap of a diameter materially larger than the diameter of the suction hose, I greatly decrease the sand-sucking tendencies of my sand strainer.

It will appear from this that I have provided a sand strainer of novel form wherein the tendency of the sand strainer to bury itself in the sand is greatly decreased both because of the fact that it rests upon a base-plate of comparatively wide area and because the water is drawn through the strainer at the upper portions thereof. It will furthermore be apparent that I have provided a sand strainer which greatly checks the velocity of the water entering it and which, for the first time, successfully prevents sand from entering the suction line. Other advantages will appear from the appended claims.

Having thus described my invention, what I claim is:

1. A sand strainer for pumps comprising a bell-shaped member of a comparatively greater diameter than the suction line to which it is connected, a laterally extending annular flange on the lower portion of said bell-shaped member, said flange being provided with a series of openings, an imperforate flat base-plate of a comparatively great area secured to said bell-shaped member, a cylindrical member disposed between the flange of said bell-shaped member and said base-plate, said cylindrical member being provided with openings in the upper portion thereof, but not in the lower portion thereof, a screen for covering said openings, said bell-shaped member being also provided with a downwardly depending cylindrical extension which overlies said apertures and is adapted to form a trap, the diameter of said extension being substantially greater than the suction line to which said strainer is connected.

2. A sand strainer for pumps comprising a bell-shaped member, means for connecting said bell-shaped member to the suction line of the pump, a laterally extending annular flange on the lower portion of said bell-shaped member, said flange being provided with a series of openings, an imperforate flat base-plate secured to said bell-shaped member, a cylindrical member disposed between the flange of said bell-shaped member and the base-plate, said cylindrical member being provided with side openings, said bell-shape member being also provided with a downwardly depending cylindrical extension, the lower edge of which is spaced from said base-plate.

3. A sand strainer comprising a body portion, said body portion including a top portion which is downwardly and outwardly flared, an apertured flange extending laterally from said top portion, apertures in the upper portion of the side walls of said body portion but not in the lower portion of said side walls, means for retarding the flow of water through said strainer to decrease the velocity of said flow, said means comprising a trap which is formed within said body portion by a depending flange which is an extension of the downwardly and outwardly flared top portion and which overlies said openings in said side walls, the area enclosed by said flange being substantially greater than the cross-sectional area of the suction line to which said strainer is connected.

4. A sand strainer comprising a body portion, said body portion including a top portion which is downwardly and outwardly flared, an apertured flange extending laterally from said top portion, apertures in the upper portion of the side walls of said body portion but not in the lower portion of said side walls, means for retarding the flow of water through said strainer to decrease the velocity of said flow, said means comprising a trap which is formed within said body portion by a depending flange which is an extension of the downwardly and outwardly flared top portion and which overlies said openings in said side walls, the area enclosed by said flange being substantially greater than the cross-sectional area of the suction line to which said strainer is connected, and a flat imperforate base-plate of comparatively great area secured to said body portion, said depending flange terminating at a point above said base-plate.

5. A sand strainer for pumps comprising a body portion of considerably greater diameter than the suction line to which it is connected, an imperforate base plate secured to said body portion, said body portion being provided with apertures in the upper portion thereof and being devoid of apertures in the lower portion thereof, and a flange depending from said body portion to produce a trap, said flange being so disposed relative to said apertures as to produce a trap and so that a portion of said apertures will extend slightly below the lowermost edge of said flange.

6. A sand strainer for pumps comprising a body portion having an upper hollow portion of greater cross-sectional area than the suction line to which it is connected, a lower hollow portion of greater cross-sectional area than the said upper portion and being in communication therewith, a flat imperforate base plate on said lower portion, apertures formed in the upper portion only of the side walls of said lower portion, the side walls of said upper portion extending down into said lower portion but terminating at a point spaced above said base plate, said apertures and the said downwardly extending side wall of said upper portion being arranged in such a manner relative to each other that a portion of said apertures will lie slightly below the lowermost edge of said wall.

7. A sand strainer for pumps comprising a hollow member of comparatively greater cross-sectional area than the suction line to which it is connected, a laterally extending flange on said member, said flange being provided with a series of openings, an imperforate flat base plate of a comparatively great area secured to said member, a wall member disposed between said flange and said base plate, said wall member being provided with openings in the upper portion thereof but not in the lower portion thereof, said hollow member being also provided with a downwardly depending extension which overlies said apertures in said wall member and is adapted to form a trap, the cross-sectional area of said extension being substantially greater than the suction line to which the strainer is connected.

ARTHUR C. SAXE.